US00RE48745E

(19) United States
(12) Reissued Patent
Braunheim

(10) Patent Number: US RE48,745 E
(45) Date of Reissued Patent: Sep. 21, 2021

(54) FILTER DEVICE

(71) Applicant: Mahle International GmbH, Stuttgart (DE)

(72) Inventor: Michael Braunheim, Goeppingen (DE)

(73) Assignee: Mahle International GmbH

(21) Appl. No.: 16/675,424

(22) Filed: Nov. 6, 2019

Related U.S. Patent Documents

Reissue of:
(64) Patent No.: 9,810,373
Issued: Nov. 7, 2017
Appl. No.: 14/710,292
Filed: May 12, 2015

U.S. Applications:
(63) Continuation of application No. 13/059,603, filed as application No. PCT/EP2009/059475 on Jul. 23, 2009, now Pat. No. 9,108,125.

(30) Foreign Application Priority Data

Aug. 18, 2008 (DE) ..... 102008038160.8

(51) Int. Cl.
*B01D 17/02* (2006.01)
*B01D 17/04* (2006.01)
(Continued)

(52) U.S. Cl.
CPC ..... *B01D 27/148* (2013.01); *B01D 17/045* (2013.01); *B01D 27/00* (2013.01);
(Continued)

(58) Field of Classification Search
CPC .... B01D 29/58; B01D 17/045; B01D 27/148; B01D 35/005; B01D 27/00; B01D 27/14;
(Continued)

(56) References Cited

U.S. PATENT DOCUMENTS 3,312,350 A * 4/1967 Walter ..... F02M 37/221 210/307
4,437,986 A 3/1984 Hutchins et al.
(Continued)

FOREIGN PATENT DOCUMENTS

DE 1239134 B 4/1967
DE 3215161 C1 12/1983
(Continued)

OTHER PUBLICATIONS

English abstract for JP H05231257 A.
(Continued)

*Primary Examiner* — Norca L. Torres Velazquez
(74) *Attorney, Agent, or Firm* — Fishman Stewart PLLC

(57) ABSTRACT

A filter device may include a filter housing and a filter element defining a longitudinal axis disposed in the filter housing. The filter element may be configured to be penetrated by a fluid flow in a radial direction from a raw end to a pure end of the filter element. A water separator may be disposed at the pure end of the filter element and arranged axially spaced from the same. The water separator may have a hydrophobic and annular diaphragm extending in an axial direction of the filter element configured to be penetrated by the fluid flow from a raw end of the water separator in a radially outward to a radially inward direction with respect to the longitudinal axis to separate water from the fluid flow.

30 Claims, 5 Drawing Sheets

(51) Int. Cl.

| | |
|---|---|
| ***B01D 27/14*** | (2006.01) |
| ***B01D 36/00*** | (2006.01) |
| ***B01D 35/00*** | (2006.01) |
| ***B01D 29/58*** | (2006.01) |
| ***B01D 27/00*** | (2006.01) |

(52) U.S. Cl.
CPC ..... *B01D 27/14* (2013.01); *B01D 27/146* (2013.01); *B01D 29/58* (2013.01); *B01D 35/005* (2013.01); *B01D 36/003* (2013.01); *B01D 2313/44* (2013.01)

(58) Field of Classification Search
CPC . B01D 27/146; B01D 36/003; B01D 2313/44
See application file for complete search history.

(56) References Cited

U.S. PATENT DOCUMENTS

| | | | | |
|---|---|---|---|---|
| 5,017,285 | A | 5/1991 | Janik et al. | |
| 5,084,170 | A | 1/1992 | Janik et al. | |
| 6,716,349 | B2 | 4/2004 | Baracchi et al. | |
| 9,333,448 | B2 | 5/2016 | Braunheim et al. | |
| 9,486,724 | B2 | 11/2016 | Volkmer et al. | |
| 9,919,246 | B2 | 3/2018 | Eberle et al. | |
| 2002/0157999 | A1* | 10/2002 | Baracchi ..... | B01D 17/045 210/299 |
| 2008/0035537 | A1 | 2/2008 | Klein et al. | |
| 2008/0135469 | A1 | 6/2008 | Fremont et al. | |
| 2008/0164042 | A1 | 7/2008 | Mascall | |
| 2013/0327699 | A1 | 12/2013 | Gaenswein et al. | |
| 2014/0284268 | A1 | 9/2014 | Volkmer | |
| 2016/0076353 | A1 | 3/2016 | Berle et al. | |
| 2017/0144091 | A1 | 5/2017 | Wolhowe | |
| 2018/0008912 | A1 | 1/2018 | Spelter et al. | |
| 2018/0008918 | A1 | 1/2018 | Spelter et al. | |
| 2018/0028949 | A1 | 2/2018 | Baumann et al. | |
| 2018/0243677 | A1 | 8/2018 | Schwandt et al. | |
| 2018/0333662 | A1 | 11/2018 | Ammersdoerfer | |

FOREIGN PATENT DOCUMENTS

| | | | |
|---|---|---|---|
| DE | 3215161 | C1 | 12/1983 |
| DE | 69021792 | T2 | 1/1996 |
| DE | 69030270 | T2 | 10/1997 |
| DE | 10123190 | A1 | 11/2002 |
| DE | 60104958 | T2 | 8/2005 |
| DE | 102006034874 | A1 | 1/2008 |
| DE | 102007048550 | A1 | 4/2008 |
| DE | 102006000533 | A1 | 6/2008 |
| DE | 102009041523 | A1 | 3/2011 |
| DE | 102010023650 | A1 | 12/2011 |
| DE | 102010062595 | A1 | 6/2012 |
| DE | 102010062813 | A1 | 6/2012 |
| DE | 112012005128 | A5 | 10/2014 |
| DE | 102014222509 | A1 | 5/2016 |
| DE | 102015201274 | A1 | 7/2016 |
| DE | 102015003163 | A1 | 9/2016 |
| DE | 102015003165 | A1 | 9/2016 |
| DE | 112016001185 | A5 | 11/2017 |
| DE | 102016217907 | A1 | 3/2018 |
| DE | 112016003302 | T5 | 5/2018 |
| DE | 102017004813 | A1 | 11/2018 |
| DE | 102017218995 | A1 | 4/2019 |
| EP | 0106736 | A2 | 4/1984 |
| EP | 0405447 | A2 | 1/1991 |
| EP | 1194207 | A1 | 4/2002 |
| EP | 1256707 | A2 | 11/2002 |
| EP | 1932574 | A1 | 6/2008 |
| EP | 2542323 | A1 | 1/2013 |
| EP | 2986572 | A1 | 2/2016 |
| EP | 3164205 | A1 | 5/2017 |
| JP | S61167467 | U | 10/1986 |
| JP | H038404 | A | 1/1991 |
| JP | 5-503029 | A | 5/1993 |
| JP | 5-231257 | A | 9/1993 |
| JP | H05231257 | A | 9/1993 |
| JP | H09299716 | A | 11/1997 |
| JP | 2004305921 | A | 11/2004 |
| RU | 2687903 | C1 | 5/2019 |
| WO | WO-91/03301 | A1 | 3/1991 |
| WO | WO-2016071147 | A1 | 3/2016 |

OTHER PUBLICATIONS

Machine translation of DE102017218995.
English abstract for DE 101 23 190 A1.
English abstract for DE102007048550.
English abstract for JPH09299716 (A).
English abstract for JPH038404 (A).
English abstract for JP2004305921 (A).
English abstract for DE102010062595.
Machine translation of DE102015201274A1.
Machine translation of DE102016217907A1.
Machine translation of RU2687903C1.
English abstract for DE-102007042550.
English abstract for DE-3215161.
English abstract for JP-5-231257.
Japanese Office Action for JP2011-523373.

* cited by examiner

FILTER DEVICE

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

CROSS-REFERENCE TO RELATED APPLICATIONS

This application is a *Reissue Application of U.S. patent application Ser. No. 14/710,292, filed May 12, 2015, now U.S. Pat. No. 9,810,373, issued Nov. 7, 2017, which is a* Continuation of U.S. patent application Ser. No. 13/059,603, filed May 11, 2011, *now U.S. Pat. No. 9,108,125, issued Aug. 18, 2015,* which is a National Stage Application of PCT/EP2009/059475, filed Jul. 23, 2009, which claims priority to German Patent Application No. 10 2008 038 160.8, filed Aug. 18, 2008, all of which are hereby incorporated by reference in their entirety.

TECHNICAL FIELD

The present invention relates to a filter device for an internal combustion engine of a motor vehicle according to the preamble of the independent claims. The invention relates further to a motor vehicle with an internal combustion engine comprising such a filter device.

BACKGROUND

Filter devices, in particular fuel/lubricant filters, are widely used in modern motor vehicles and serve for cleaning the fuels and lubricants. All usual fuels/lubricants have in common that they contain an insignificant proportion of water which, however, on the one hand, affects the fuel/lubricant with respect to its function and, on the other, increases the corrosion risk for the internal combustion engine. For this reason, a plurality of so-called water separators is already known by means of which the attempt is made to filter out or separate, as far as possible, the water content still contained in the fuel/lubricant. The higher the achievable degree of water separation, the lower is the occurring corrosion risk or the risk of an adverse effect on the function of the internal combustion engine caused by the water content.

SUMMARY

The present invention is concerned with the problem to provide an improved embodiment of a generic filter device which is in particular characterized by a particularly good water separation.

This problem is solved according to the invention by the subject matters of the independent claims. Advantageous embodiments are subject matter of the dependent claims.

The invention is based on the general idea to arrange a water separator in a filter device, in particular a fuel or lubricant filter, which water separator is arranged in a filter element of the filter device and comprises a hydrophobic, annular diaphragm through which fuel/lubricant can flow from a radially outward to a radially inward direction and which extends in the axial direction of the filter element. The arrangement of the water separator below the filter element, which is formed as so-called annular filter element, provides a sedimentation chamber on a raw end of the water separator which chamber effects in connection with the hydrophobic diaphragm that the water content of the fuel or lubricant can be filtered out preferably completely from the latter. The diaphragm is arranged vertically and the flow passes therethrough from radially outward to radially inward. By the fact that the crude chamber is located in the radial outward direction with respect to the water separator, the flow velocity in said crude chamber can be considerably reduced compared to the flow velocity in the pure chamber and with respect to the filter element, whereby the sedimentation effect of the heavier water is additionally supported. During the operation of the filter device according to the invention, the vertically arranged annular diaphragm through which the fuel or lubricant has to pass causes in addition a flow deflection of the fuel or lubricant to be cleaned which flows initially parallel to the diaphragm and which, shortly before passing through the latter, is deflected in a direction running orthogonal to the diaphragm. Hereby, the water to be separated can particularly easily and effectively accumulate on the hydrophobic surface of the diaphragm and, due to the gravity, can flow downwards along said surface into a water collection/sedimentation chamber. A crucial advantage here is the aforementioned low flow velocity within the crude chamber of the water separator, whereby a particularly high sedimentation rate for water to be separated can be achieved therein and thus a particularly good water separation can be achieved. Due to the high water separation rate, in particular the corrosion risk for the internal combustion engine can be reduced and the function of the fuel or the lubricant can be increased.

In an advantageous development of the solution according to the invention, the flow passes through the filter element of the filter device and through the water separator from a radially outward direction to a radially inward direction, wherein in the axial direction between the filter element and the water separator, a flow channel is provided which connects the pure end of the filter element with the raw end of the water separator and through which the filtered fuel or lubricant flows spirally in the radially outward direction. Through such a channel configuration it thus can be achieved that a lower flow velocity is present at the raw end of the water separator than at the pure end of the filter element, whereby, as described in detail in the previous paragraph, the sedimentation rate for water to be separated can be increased and therefore the degree of separation can be improved. Moreover, due to such a flow guidance within the filter device, a particularly compact design of the same is possible which is of particular advantage specifically with respect to the available installation space which becomes smaller and smaller in modern engine compartments.

In a further advantageous embodiment of the solution according to the invention, the filter element and the water separator are formed either as separate components or as a single combination component. The formation as separate components offers the advantage that the filter element and also the water separator can be replaced as required, that is, individually, so that an unnecessary replacement of the filter element or the water separator can be avoided when only the water separator or the filter element, respectively, is ready to be replaced. In contrast, the formation as combination component has the advantage that always both components, that is, the filter element and also water separator are replaced, whereby, on the one hand, the assembly and disassembly work can be reduced and thus can be carried out in a more cost-effective manner and, on the other, lower storage and logistic costs can be expected because in case of a combination component it is not necessary to store or to logistically administer two separate components.

Advantageously, a coalescer is provided at the pure end of the filter element, in particular on an outer side of an inner skirt. Such a coalescer, for example, can be adapted in a defined manner to the coalescence behavior of the liquid to be separated, in this case the water, whereby a particularly high degree of water separation can be achieved. Usually, porous materials, wire meshes and packing elements through which the liquid mixture flows are used as coalescer. Generally, coalescers function always according to the same principle; they form a barrier for small droplets of the material to be coalesced and droplets get caught at said barrier and gradually coalesce to form larger units. Once the coalesced drops reach a certain predefined size, due to the gravity, they can run along the coalescer and can be collected below the same. Generally, such coalescing materials are inexpensive and can be produced in almost any embodiment.

Further important features and advantages of the invention arise from the sub-claims, from the drawings, and from the associated description of the figures based on the drawings.

It is to be understood that the above mentioned features and the features yet to be explained hereinafter can be used not only in the respectively mentioned combination but also in other combinations or alone without departing from the context of the present invention.

Preferred exemplary embodiments of the invention are illustrated in the drawings and are explained in the following description in more detail, wherein identical reference numbers refer to identical, or similar, or functionally identical components.

DETAILED DESCRIPTION

Figure 1:
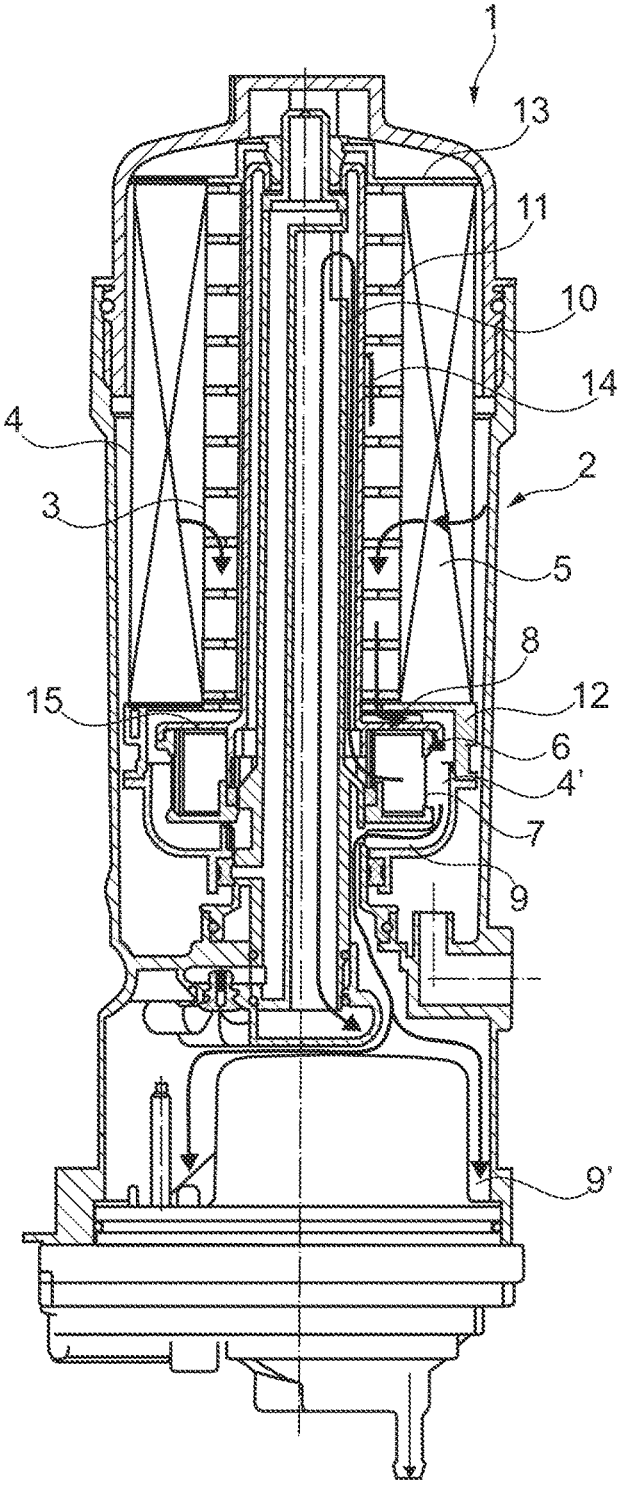
FIG. 1 shows a sectional view through a filter device according to the invention.

According to FIG. 1, a filter device 1 according to the invention which, for example, is formed as fuel filter, comprises a filter housing 2 and an annular filter element 5 which is arranged therein and through which a flow penetrates in the radial direction from a raw end 4 to a pure end 3. In this case, the raw end 4 is located radially on the outside while the pure end 3 of the filter element 5 is arranged radially on the inside. At the pure end 3 of the filter element 5 or, more precisely, below the latter, a water separator 6 is arranged which is also penetrated by a flow from a radially outward direction to a radially inward direction and which has an annular diaphragm 7 through which fuel/lubricant can flow but which is hydrophobic and extends in the axial direction of the filter element 5.

Figure 2:
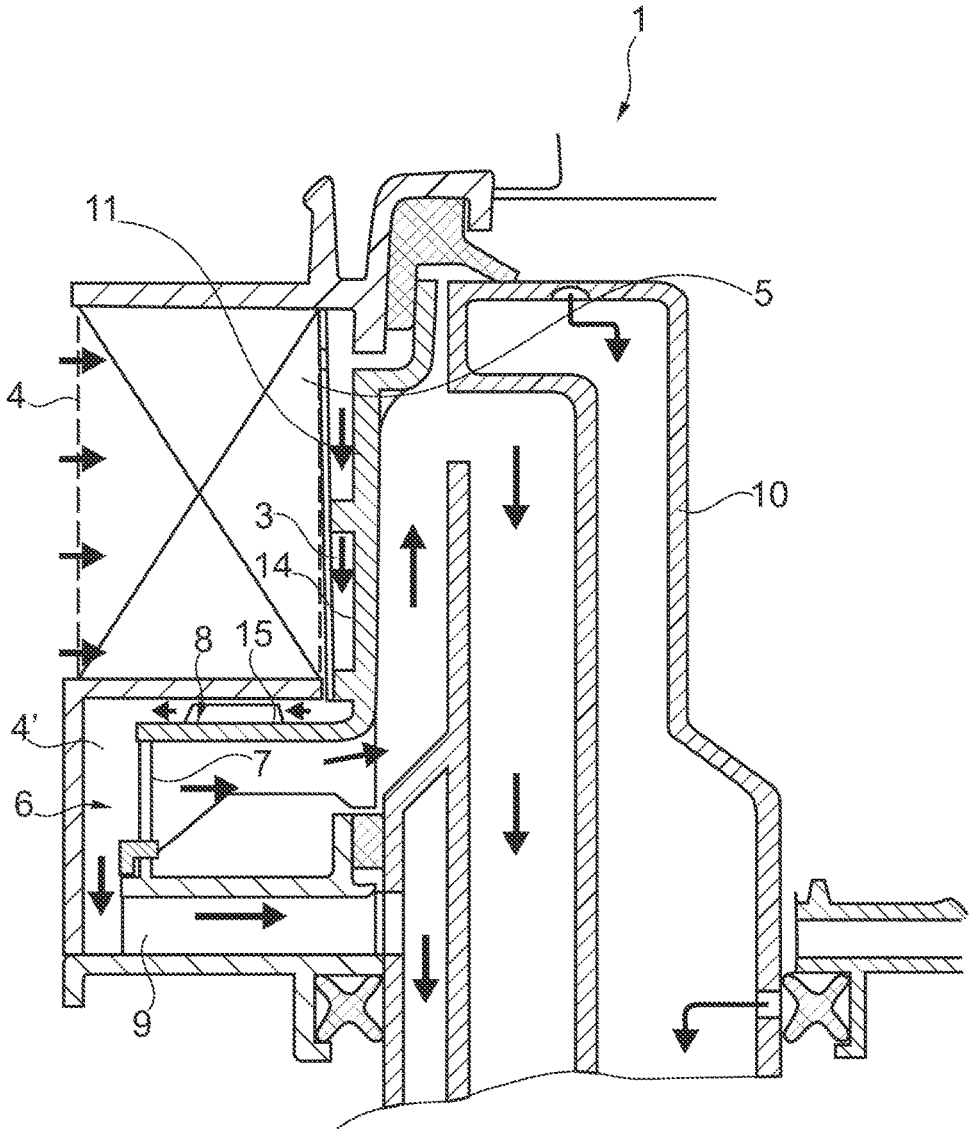
FIG. 2 shows a detailed illustration of a possible embodiment of a filter device having a water separator.
Figure 3:
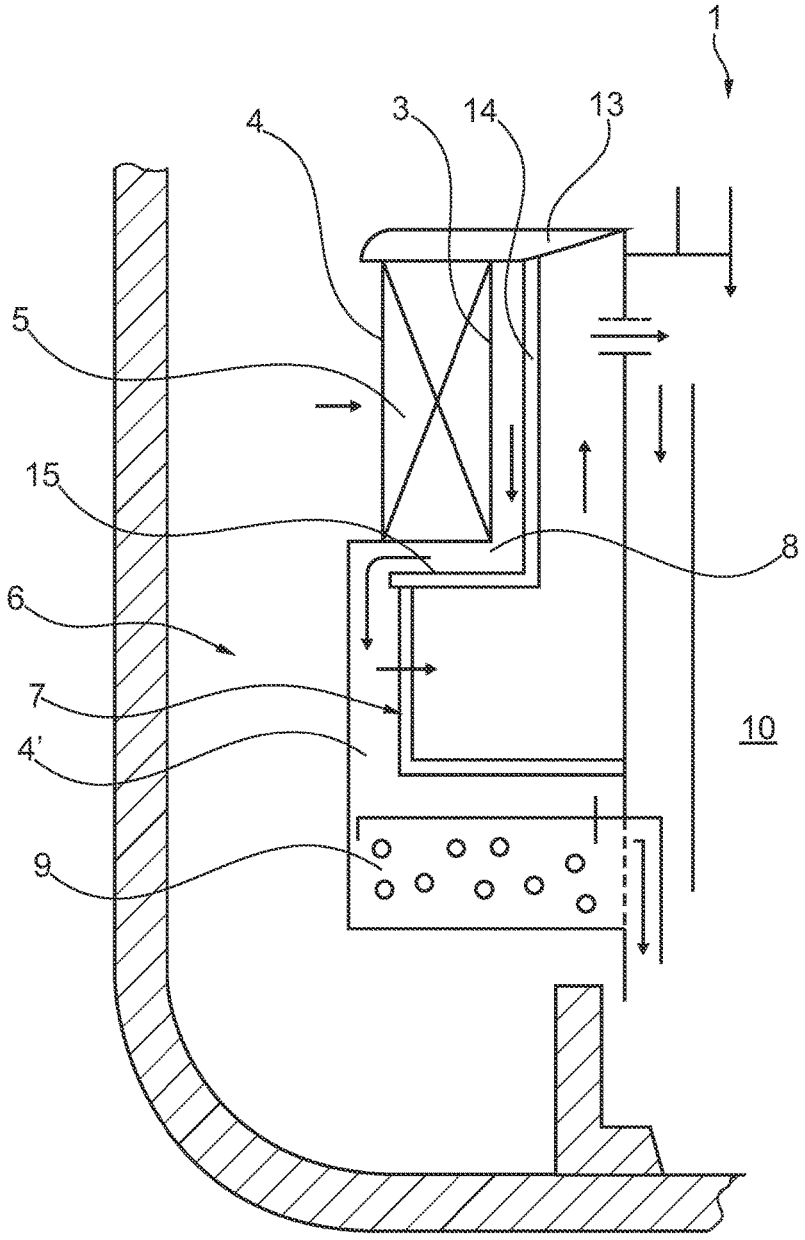
FIG. 3 shows an illustration as in FIG. 2, but of a slightly different embodiment.

Together with the FIGS. 2 and 3 which show a detailed illustration of the filter device 1 according to the invention of different embodiments in the region of the water separator 6, the functionality of the filter device 1 according to the invention and, in particular, the water separation rate increased by the water separator 6 according to the invention can be clearly illustrated: First, the fuel to be filtered flows from the raw end 4 through the filter element 5 to the pure end 3 of the same. After leaving the filter element 5 at the pure end 3, according to the FIGS. 1 to 3, the fuel flows downwards in a substantially vertical direction, that is, in the axial direction of the filter device 1 up to a flow channel 8 arranged in axial direction between the filter element 5 and the water separator 6, which flow channel connects the pure end 3 of the filter element 5 with a raw end 4' of the water separator 6 and through which the fuel flows spirally and radially outwardly so that at the raw end 4' of the water separator 6, a flow velocity is present that is lower than it was at the pure end 3 of the filter element 5. The shape of the flow channel 8 corresponds substantially to the one of an annular hollow space through which a flow penetrates in the radial direction from the inside outwards. The flow generated in this manner flows tangentially along the diaphragm 7 which, for example, can also be formed as sieve insert. The flow can be generated, for example, by ribs which are attached to a flow channel wall 15. Principally, said ribs can fulfill two functions at the same time which are, firstly, to keep the lower end disk 12 of the filter element 5 at a distance to the water separator 6 so that a constant flow cross-section of the flow channel 8 can be ensured and, secondly, by means of the shape of the ribs, the flow of the fuel can be influenced. To generate the spirally flow, for example, bent ribs can be used, the ribs being radially outwardly curved.

Due to the lower flow velocity at the raw end 4' of the water separator 6, a particularly good sedimentation of the water portions carried along in the fuel mixture is possible on this side so that the water portions can accumulate due to the gravity in a water collection chamber 9. Due to the centrifugal forces, a rotation of the fuel-water mixture at the raw end 4' of the water separator 6 has a positive effect on the separation of water and fuel. Passing through the diaphragm 7 as it is possible for the fuel is significantly more difficult for water because the diaphragm 7 is formed to be hydrophobic, that is, it is at least water-repellent. Such a hydrophobic diaphragm 7 can be formed in particular as sieve or as wire mesh.

Figure 5:
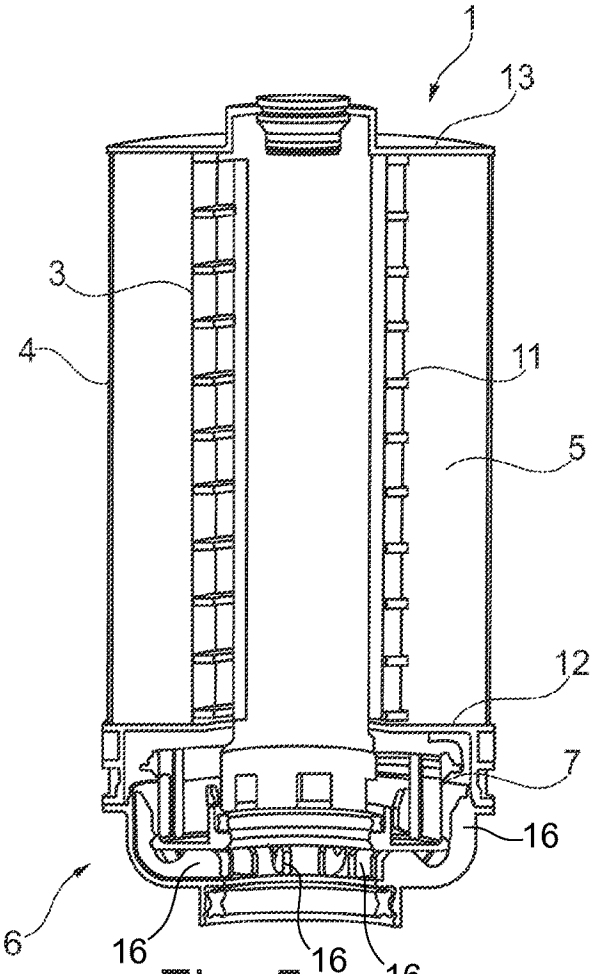
FIG. 5 shows a longitudinal section through a filter device of a further embodiment.

A rotation of the fuel/lubricant at the raw end 4' of the water separator 6 avoids the formation of local, stationary flows around a water drop, which flows could retain said drop on the diaphragm and could eventually push the drop through, and thus facilitates the sedimentation of the water portions carried along in the fuel mixture. Here, the water separator 6 (production-related or constructionally influenceable) can have regions which are distributed over the circumference and which have different flow velocities of the fuel/lubricant from the outside inwards. The largest quantity of water is present on the diaphragm 7 in the regions with high flow velocities. The water drop sticks to the diaphragm 7, the fuel/lubricant flows around said water drop and pushes the drop with a force onto the diaphragm 7. In order that the gravitational force can pull the drop downwards, the "frictional force" (the diaphragm 7 is not smooth; in some cases, a form fit between drop and diaphragm 7 can form) between diaphragm 7 and drop has to be overcome. In regions with low flow velocities, the forces pushing the water drop onto the diaphragm 7 are lower; at a flow velocity of zero, the forces are zero as well. In these regions, it is easier for the gravitational force to pull the drop downwards than in regions with high flow velocities. Now, the rotation of the fuel quantity transports the water drops separated on the diaphragm 7 through the present or constructed regions with high and low flow velocities. Preferably, in regions with low flow velocity, in particular if support geometries/ribs 16 (see FIG. 5) block the direct path through the diaphragm 7, the water drops on the diaphragm 7 sink downwards and accumulate in the water collection chamber 9.

If required, the separated water can be discharged from the water collection chamber 9, wherein it is also conceivable that, as shown in FIG. 1, a further water collection chamber 9' is arranged below the above described water collection chamber 9, in which further water collection chamber, the fuel still remaining in the separated water can be separated and can be fed again into a fuel circuit.

Figure 6:
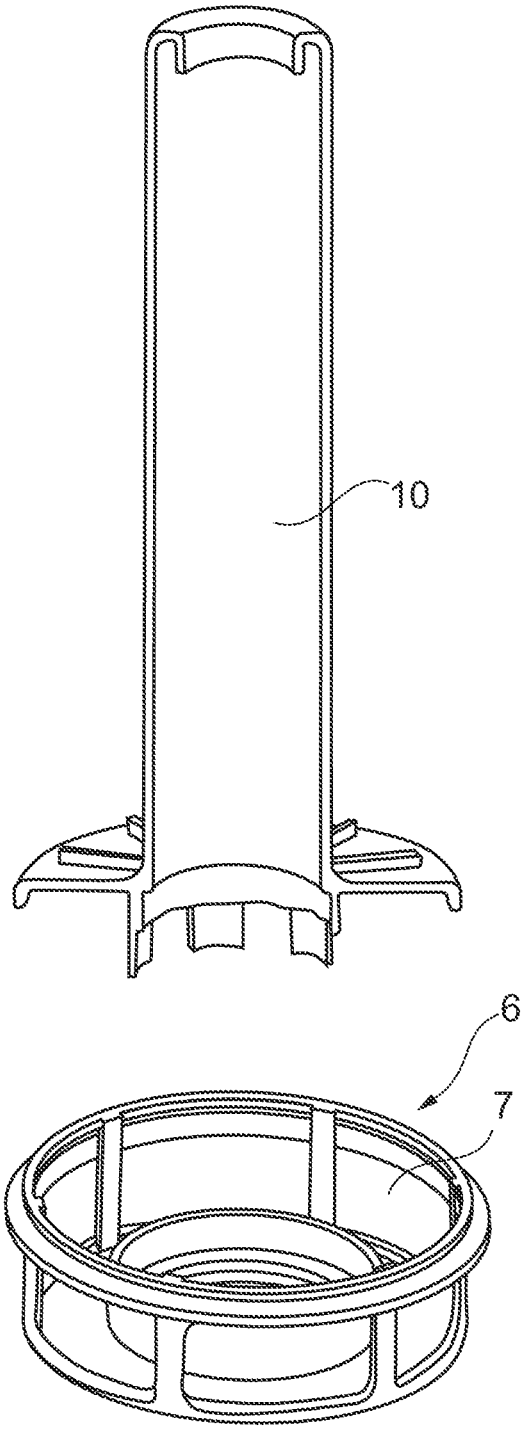
FIG. 6 shows an illustration as in FIG. 4A, but in an exploded view.

In particular in the FIGS. 1-3 it is clearly shown that the fuel, in order to pass through the diaphragm 7, needs a change of direction so that the fuel flow, which initially runs parallel to the diaphragm 7 in the crude chamber 4' of the water separator 6, is deflected in a direction orthogonal to the diaphragm 7. The water, which is heavier compared to the fuel/lubricant, sinks further downwards in vertical direction into the water collection chamber 9 as soon as the direction changes or it is carried away by the fuel/lubricant and accumulates on the hydrophobic surface of the diaphragm 7.

n order to be able to simplify the installation of the water separator 6 in the filter device 1 it can be provided, for example, that the water separator 6 is conically tapered downwardly. Moreover, a tube 10 (cf. in particular FIG. 6) projecting from the water separator 6 in the axial direction can be provided, which tube serves at the same time as receiving mandrel for retaining the filter element 5. Optionally, an inner skirt 11 stiffening the filter element 5 can be provided between the filter element 5 and the tube 10, which inner skirt ensures that the filter element 5, which usually is formed as pleated star, maintains its desired shape. The tube 10 and the water separator 6 are usually connected to each other in a non-detachable manner, in particular welded together.

In order to be able to perform the repair or maintenance of the filter device 1 in an individual manner it can be provided that the filter element 5 and the water separator 6 are formed as separate components and thus can be replaced or maintained separately as needed. Alternatively, it is conceivable that the filter element 5 and the water separator 6 form a single combination component so that when replacing the filter element 5, the water separator 6 with its diaphragm 7 is automatically replaced at the same time. The last-mentioned construction offers the advantage that instead of two separate components which first have to be connected to each other in an assembly step, only one combination component has to be stored and installed, whereby, on the one hand, the storage and logistic costs and, on the other, the manufacturing costs can be reduced.

Figure 4B:
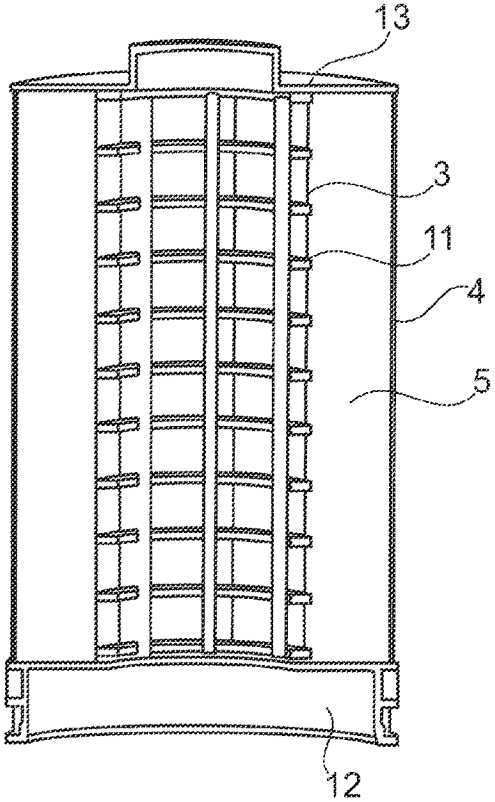
FIG. 4B shows a filter element which can be received on or attached to the mandrel according to FIG. 4A.
Figure 4A:
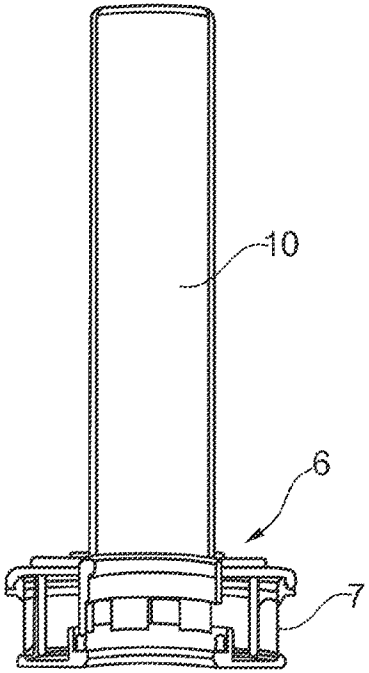
FIG. 4A shows a water separator having a tube attached thereto as receiving mandrel for a filter element.

Looking at the filter element 5 according to FIGS. 4A and 4B it is apparent that a lower end disk 12 is formed in such a manner that, in the state mounted to the water separator 6, the end disk circumferentially surrounds the crude chamber 4' of the water separator 6 as well as the latter itself. In contrast to that, an upper end disk 13 is formed in a conventional manner.

In order to be able to additionally enhance the water separation effect, a coalescing element 14 can also be arranged at the pure end 3, in particular on an outer side of the inner skirt 11. This causes that already at the pure end 3 of the filter element 5, directly after the fuel flow exits the latter, water portions accumulate and separate upon impact on the coalescing element 14, which water portions are then connected to each other in such a manner that they can discharge downwards, solely driven by their gravitational force, into the water collection chamber 9. To facilitate the discharge process of the water separated at the coalescing element 14, a channel wall 15 of the flow channel 8 can be formed extending obliquely downwards in a radially outward direction. In addition, flow guide elements can be arranged, for example, at the pure end 3 of the filter element 5 and/or at the raw end 4' of the water separator 6, which flow guide elements deflect the fuel flowing radially inwards through the filter element 5 in the circumferential direction and thereby effect that the hydrophobic diaphragm 7 is uniformly subjected to the flow.

Overall, with such a filter device 1 according to the invention, a significantly improved water separation can be achieved, whereby, on the one hand, the corrosion risk in the downstream internal combustion engine can be reduced and, on the other, the efficiency of the fuel can be improved. Of course, the filter device 1 according to the invention can also be formed for filtering lubricants, in particular oils, from which a harmful water content is to be removed.

The invention claimed is:

1. A filter device, comprising:

[a filter housing and] a filter element defining a longitudinal axis *and configured to be* disposed in [the] *a* filter housing, the filter element defining a raw end and a pure end disposed radially inwards of the raw end with respect to the longitudinal axis, the filter element configured to be penetrated by a fluid flow in a radial direction from the raw end to the pure end of the filter element; and a water separator fluidly connected to the pure end of the filter element and arranged coaxial to the filter element, the water separator disposed at an axial end of the filter element and arranged spaced apart axially outward from the same along the longitudinal axis downstream of the pure end, wherein the water separator includes a hydrophobic and annular diaphragm extending in an axial direction of the longitudinal axis configured to be penetrated by the fluid flow from a raw end of the water separator in a radially outward to a radially inward direction with respect to the longitudinal axis to separate water from the fluid flow, wherein a flow channel is disposed axially between the filter element and the water separator and guides the fluid flow radially outwards from the pure end of the filter element to the raw end of the water separator.

2. The filter device according to claim 1, further comprising a plurality of circumferentially spaced ribs distributed about a periphery of the water separator, wherein the plurality of ribs are disposed at the raw end of the water separator radially outside of the diaphragm.

3. The filter device according to claim 2, wherein the plurality of ribs extend axially from a water collection chamber into the raw end of the water separator.

4. The filter device according to claim 1, wherein the diaphragm of the water separator is disposed radially outside of the pure end of the filter element.

5. The filter device according to claim 1, further comprising a tube projecting from the water separator in the axial direction and configured to serve as a receiving mandrel for retaining the filter element.

6. The filter device according to claim 5, further comprising an inner skirt disposed between the tube and the filter element and configured to support the filter element.

7. The filter device according to claim 1, further comprising a lower end disk coupled to the axial end of the filter element, wherein the lower end disc is arranged axially between the filter element and the water separator and circumferentially surrounds the water separator.

8. The filter device according to claim 1, wherein the diaphragm of the water separator is formed as at least one of a hydrophobic sieve and a hydrophobic mesh.

9. The filter device according to claim 5, wherein the tube and the water separator are welded together.

10. The filter device according to claim 6, further comprising a coalescing material disposed at the pure end of the filter element and on an outer side of the inner skirt.

11. The filter device according to claim 1, further comprising at least one flow guide element disposed at the pure end of the filter element and configured to deflect the fluid flow in any circumferential direction.

12. A filter device for an internal combustion engine, comprising:

[a filter housing;]

a filter element defining a longitudinal axis *and configured to be* disposed in [the] *a* filter housing, the filter element defining a raw end and a pure end disposed radially inwards of the raw end with respect to the longitudinal axis, the filter element configured to be penetrated by a fluid flow in a radial direction from the raw end to the pure end of the filter element;

a water separator disposed at the pure end of the filter element and arranged coaxial to the filter element, the water separator including an axially extending hydrophobic and annular diaphragm configured to be penetrated by the fluid flow from a raw end of the water separator in a radially outward to a radially inward direction with respect to the longitudinal axis of the filter element; and wherein the diaphragm of the water separator is disposed radially outside of the pure end of the filter element.

13. The filter device according to claim 12, further comprising a tube projecting axially from the water separator and arranged coaxially with the filter element, the tube configured to serve as a retaining mandrel for retaining the filter element.

14. The filter device according to claim 13, further comprising an inner skirt extending axially long the filter element and arranged radially between the tube and the filter element; and a coalescing material arranged on a radially outer side of the inner skirt with respect to the longitudinal axis.

15. The filter device according to claim 12, further comprising a coalescing material disposed at the pure end of the filter element, wherein the coalescing material includes at least one of a porous material and a wire mesh.

16. The filter device according to claim 12, wherein the filter element defines an upper axial end face opposite a lower axial end face, wherein the water separator is in fluid communication with the pure end of the filter element and arranged spaced axially outward from the lower axial end face in a direction away the filter element.

17. The filter device according to claim 12, further comprising at least one flow guide element disposed at the pure end of the filter element and configured to deflect the fluid flow in any circumferential direction.

18. A filter device for an internal combustion engine, comprising:

[a filter housing;]

a filter element defining a longitudinal axis *and configured to be* disposed in [the] *a* filter housing, the filter element extending axially along the longitudinal axis between an upper end and an axially opposite lower end, and defining a raw end and a radially inner pure end, the filter element configured to be penetrated by a fluid flow in a radial direction from the raw end to the pure end of the filter element;

a water separator disposed [in the filter housing] at the lower end of the filter element and fluidly connected to the pure end of the filter element, the water separator including an axially extending hydrophobic and annular diaphragm configured to be penetrated by the fluid flow from a radially outward to a radially inward direction with respect to the longitudinal axis of the filter element; and wherein the water separator is arranged at a distance axially outward from the lower end of the filter element, and wherein the diaphragm of the water separator is disposed radially outside of the pure end of the filter element.

19. The filter device according to claim 18, further comprising a plurality of ribs distributed about the water separator in a circumferential direction, wherein the plurality of ribs are disposed at a raw end of the water separator radially outside of the diaphragm.

*20. A filter device, comprising:*

*a filter element defining a longitudinal axis and defining a raw end and a pure end disposed radially inwards of the raw end with respect to the longitudinal axis, the filter element configured to be penetrated by a fluid flow in a radial direction from the raw end to the pure end of the filter element; and*

*a water separator fluidly connected to the pure end of the filter element and arranged coaxial to the filter element, the water separator disposed at an axial end of the filter element and arranged spaced apart axially outward from the same along the longitudinal axis downstream of the pure end,*

*wherein the water separator includes a hydrophobic diaphragm extending in an axial direction of the longitudinal axis configured to be penetrated by the fluid flow from a raw end of the water separator in a radially inward direction with respect to the longitudinal axis, wherein a flow channel is disposed axially between the filter element and the water separator and guides the fluid flow radially outwards from the pure end of the filter element to the raw end of the water separator.*

*21. The filter device according to claim 20, further comprising a plurality of circumferentially spaced ribs distributed about a periphery of the water separator, wherein the plurality of ribs are disposed at the raw end of the water separator radially outside of the diaphragm.*

*22. The filter device according to claim 21, wherein the plurality of ribs extend axially from a water collection chamber into the raw end of the water separator.*

*23. The filter device according to claim 20, wherein the diaphragm of the water separator is disposed radially outside of the pure end of the filter element.*

*24. The filter device according to claim 20, further comprising a tube projecting from the water separator in the*

*axial direction and configured to serve as a receiving mandrel for retaining the filter element.*

*25. The filter device according to claim 24, further comprising an inner skirt disposed between the tube and the filter element and configured to support the filter element.*

*26. The filter device according to claim 20, further comprising a lower end disk coupled to the axial end of the filter element, wherein the lower end disc is arranged axially between the filter element and the water separator and circumferentially surrounds the water separator.*

*27. The filter device according to claim 20, wherein the diaphragm of the water separator is formed as at least one of a hydrophobic sieve and a hydrophobic mesh.*

*28. The filter device according to claim 24, wherein the tube and the water separator are welded together.*

*29. The filter device according to claim 25, further comprising a coalescing material disposed at the pure end of the filter element and on an outer side of the inner skirt.*

*30. The filter device according to claim 20, further comprising at least one flow guide element disposed at the pure end of the filter element and configured to deflect the fluid flow in any circumferential direction.*

* * * * *